H. C. HUBBELL.
METHOD AND MEANS FOR MAKING ELECTRICAL CONNECTIONS.
APPLICATION FILED JULY 12, 1920.
1,378,461.
Patented May 17, 1921.
3 SHEETS—SHEET 1.
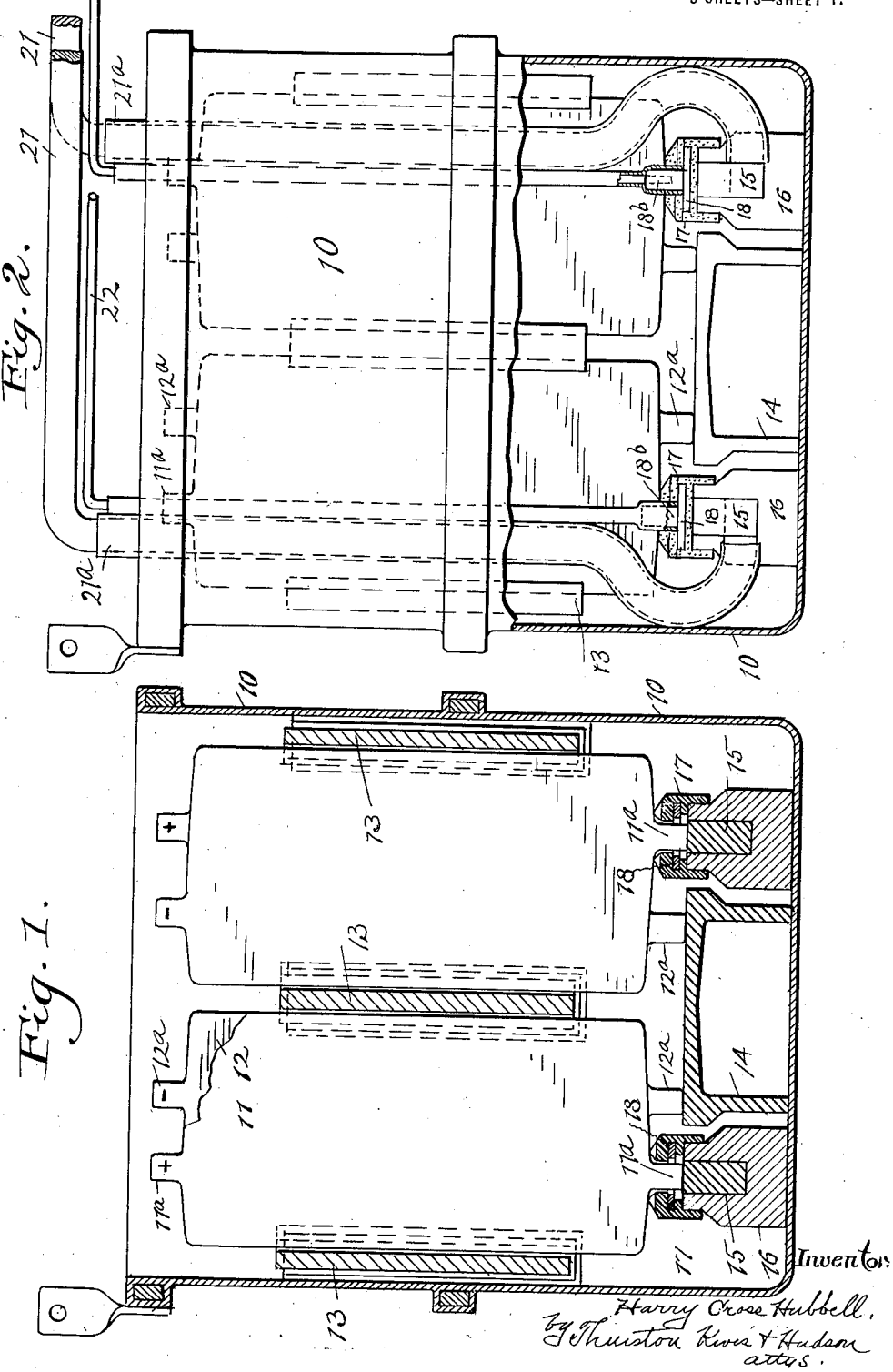
Inventor
Harry Crose Hubbell,
by Thurston Kivis & Hudson
attys.

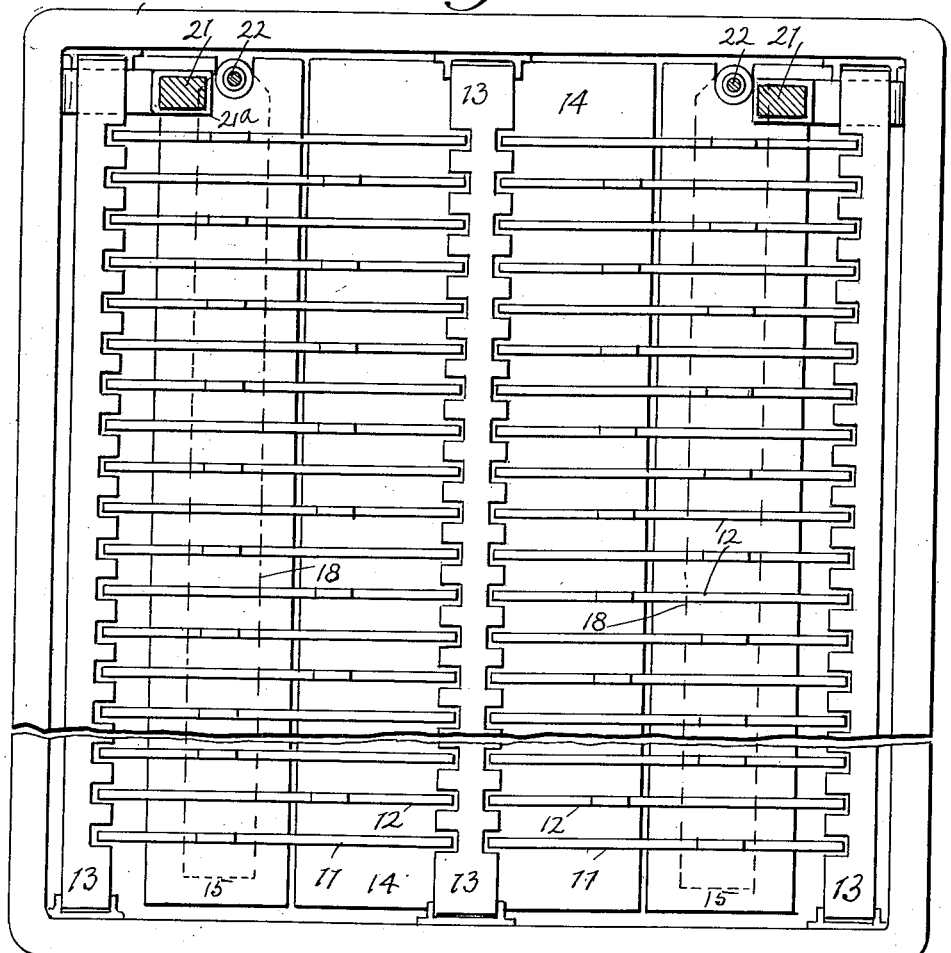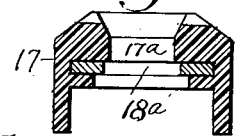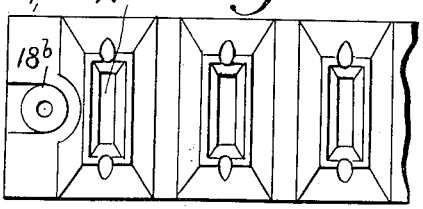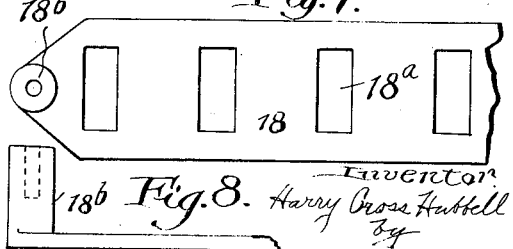

H. C. HUBBELL.
METHOD AND MEANS FOR MAKING ELECTRICAL CONNECTIONS.
APPLICATION FILED JULY 12, 1920.
1,378,461.
Patented May 17, 1921.
3 SHEETS—SHEET 3.
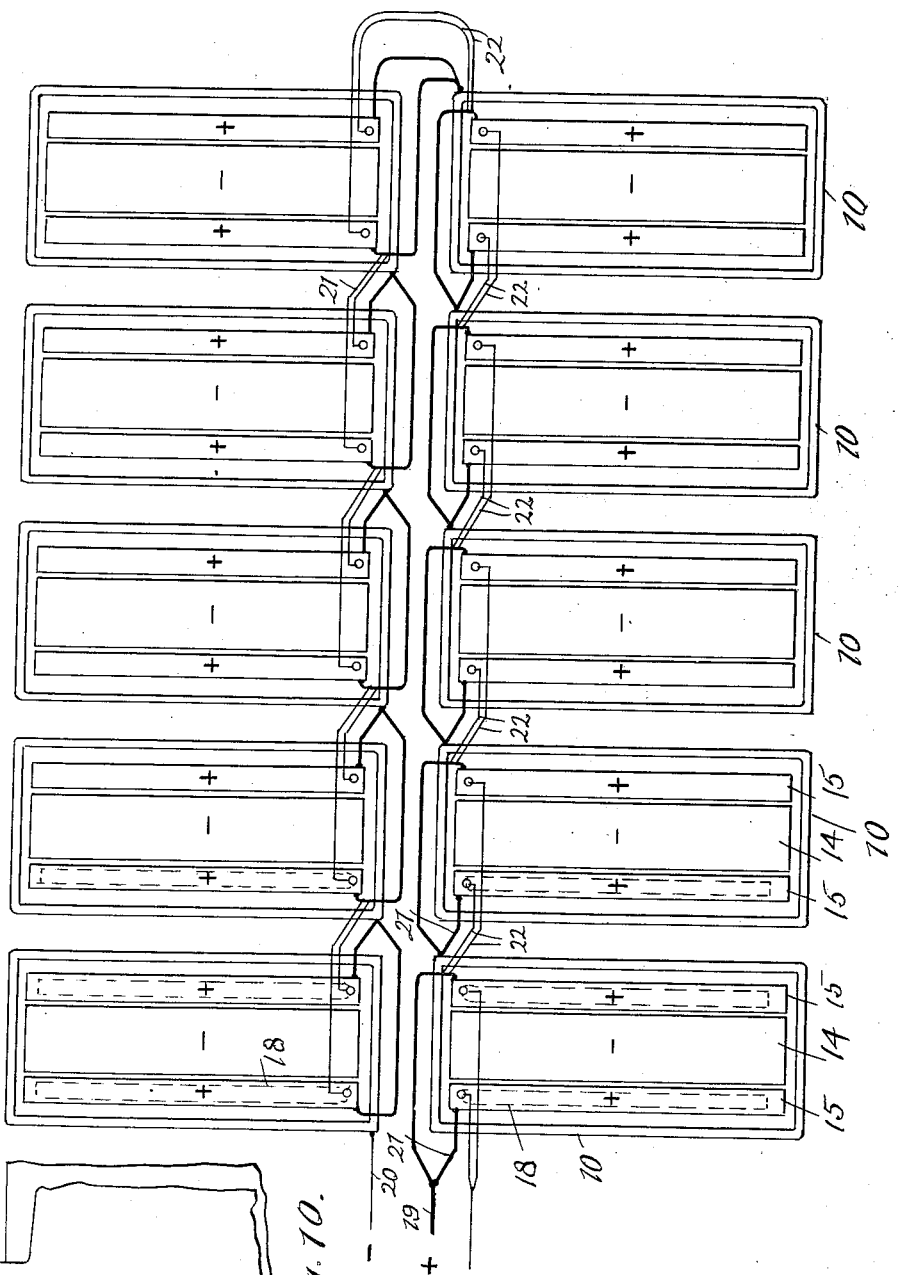
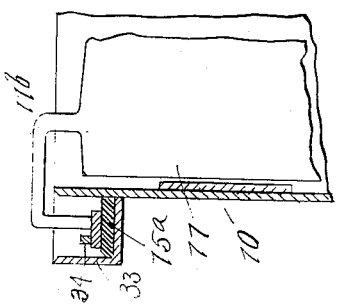
Inventor:
Harry Cross Hubbell
by
Thurston Rivers & Hudson
attys.

UNITED STATES PATENT OFFICE.

HARRY CROSS HUBBELL, OF CLEVELAND, OHIO, ASSIGNOR TO WILLARD STORAGE BATTERY COMPANY, OF CLEVELAND, OHIO, A CORPORATION OF WEST VIRGINIA.

METHOD AND MEANS FOR MAKING ELECTRICAL CONNECTIONS.

1,378,461.     Specification of Letters Patent.     Patented May 17, 1921.

Application filed July 12, 1920. Serial No. 395,672.

*To all whom it may concern:*

Be it known that I, HARRY CROSS HUBBELL, a citizen of the United States, residing at Cleveland, in the county of Cuyahoga and State of Ohio, have invented a certain new and useful Improvement in Methods and Means for Making Electrical Connections, of which the following is a full, clear, and exact description.

The present invention relates to a method and means for making electrical connections, and has particular utility in connection with the manufacture of storage battery plates, and especially in making electrical connections to the plates when placed in a tank containing a suitable electrolyte such as dilute sulfuric acid to receive their initial or forming charge.

In manufacturing lead storage battery plates it is customary after the plates are pasted with their respective materials, to place them in large lead or porcelain tanks containing dilute sulfuric acid in order that they may receive their initial or "forming charge" which is desirable to give the plates before they are assembled into a complete battery.

When the plates are placed in the tank to receive their forming charge, electrical connection is usually made with the plates by fusing copper wires to lugs of the plates projecting above the electrolyte. This is generally done by means of a hydrogen flame of a blow torch attached to a long rubber hose. This operation has several disadvantages inasmuch as it is expensive, slow, and a delicate one, requiring long practice. Furthermore, the wires are used only once, and then are scrapped and the electrolyte becomes contaminated with copper from these wires. Additionally, even with careful work poor connections are frequent, causing loss in production, and the long rubber tubes are expensive to maintain. Finally the hydrogen flame is dangerous.

It is the object of the present invention to eliminate altogether the necessity for wiring storage battery plates or other members or devices, especially where electrical connections are to be made in an electrolyte.

More specifically the invention aims to maintain the contacting surfaces of two conductors in a metallic condition under circumstances which would ordinarily result in the formation of metallic salts, such as oxids or sulfates on the surface of one or all conductors.

The invention may be briefly summarized as consisting in certain novel features of the improved method, and means or apparatus for carrying out the method which will be described in the specification and set forth in the appended claims.

In the accompanying sheets of drawings I have shown my invention applied to apparatus for giving storage battery plates their initial or forming charge, and while the invention in certain aspects relates to this apparatus, I do not wish to confine the invention to this particular field, as I believe it has utility for purposes specifically different than that just mentioned.

In the drawings, Figure 1 is a vertical, transverse sectional view through a forming tank equipped with one form of my invention and illustrating the manner in which electrical connection is made with the positive and negative plates without the necessity of the wiring heretofore employed, but by contact of lugs on the plates with conductors in the tank; Fig. 2 is an end view of the tank with parts broken away to show certain electrical connections with contact conductors; Fig. 3 is a top plan view of the same with a portion of the tank removed; Fig. 4 is a side view with parts in section of a special conductor and its mounting of insulating material, which conductor is employed in close association with a conductor in the tank with which the lugs of the positive plates engage; Fig. 5 is a transverse sectional view of the same; Fig. 6 is a top plan view of the mounting or carrier for the special conductor; Figs. 7 and 8 are detail views of the conductor referred to; Fig. 9 is a top plan view of a number of forming tanks such as shown in Figs. 1 to 3 and illustrating one way in which the various conductors of the tanks can be wired; and Fig. 10 is a sectional view showing a modification.

Referring now to the drawings, 10 represents a tank such as commonly utilized in giving storage battery plates their initial or forming charge. These tanks are generally of a size such that they will accommodate a large number of plates which are commonly arranged in two rows or series, and in practice, especially in a plant equipped to manufacture storage batteries on a large scale, a large number of these tanks will be arranged side by side and in rows so that a sufficient quantity of plates can be given their forming charge at the same time. These tanks are supplied with an electrolyte, generally dilute sulfuric acid, and are formed of lead, porcelain or other material which is not attacked by the electrolyte. The positive and negative plates are indicated at 11 and 12 respectively, and as here shown, they are arranged in parallel rows extending lengthwise of the tank, each row consisting of alternate positive and negative plates which are spaced and held a predetermined distance apart by wood or other insulating spacers 13 arranged along the sides and at the center of the tank, and provided with vertical slots into which the edge portions of the plates are slipped.

It will be observed that in this instance double plates are shown, i. e. plates of little more than twice the dimensions of an ordinary plate, with lugs $11^a$ and $12^a$ at both their upper and lower ends, it being intended that plates of this type be subsequently divided by being cut transversely at the center. However, single plates could be employed as readily as the double plates.

In accordance with the present invention I do away entirely with the wiring consisting of conductors, which are usually burned in the manner heretofore stated, to the tops of the lugs $11^a$ and $12^a$, and I make connections between the positive and negative plates simply by contact and weight of the plates on the conductors. In this instance the conductors are arranged at the bottom of the tank and are engaged by the lower lugs of the plates, but the conductors may be otherwise arranged, as for example, at or adjacent the top of the tank, if such arrangement becomes advisable. The negative conductor, i. e. the conductor which is engaged by the negative plates, is shown at 14, this conductor in this case extending centrally along the bottom of the tank and resting thereon. This negative conductor 14 which may be formed of lead or antimony lead, is electrically connected to the tank, (assuming that the latter is formed of conductor material such as lead) and may, in fact, be a part of the tank. In either event the whole tank acts as a negative conductor, making the resistance of this part of the circuit very low. The positive conductor, or rather the two positive conductors in this case, since the plates are arranged in two rows in the tank, are shown at 15. These conductors which likewise are formed of lead or antimony lead, extend lengthwise of the tank alongside the negative conductor 14, but are insulated from the latter and from the tank by being set into slots of suitable wood or other insulators 16.

In view of the fact that nascent hydrogen is liberated at the negative plates, metallic salts are not formed on the contacting surfaces of the conductor 14 and lugs $12^a$ of the negative plates 12, and the contacting portions of the conductor 14 and lugs of the negative plates are maintained in metallic condition, and good contact is therefore at all times obtained, the metallic condition of the contacting surfaces and the weight of the plates maintaining contacts or joints of sufficient low resistance.

This situation would not ordinarily, and without the present invention prevail with the positive plates and positive conductor, for due to the formation of nascent oxygen at the positive plates, salts would form on the surfaces of the contacting parts and prevent or destroy conductivity between the parts. To avoid the formation of metallic salts such as oxids, sulfates, etc., the contacting portions of the conductors 15 and of the lugs $11^a$ are by the present invention maintained under cathode conditions precisely as with the conductor 14 and lugs $12^a$ of the negative plates instead of anode conditions which would ordinarily prevail. In consequence, since the conductors and the contacting portions of the lugs of both the positive and negative plates are maintained under cathode conditions metallic salts will not form or will be reduced to sponge lead. Thus the contacting surfaces will be kept in metallic condition by electrolytic action, and by this means assisted by the pressure of the weight of the plates the contacting portions of the conductors 14 and 15 and the lugs of the plates have good conductivity.

To maintain the condition above stated at the conductors 15 and lugs of the positive plates, i. e. to maintain them under cathode conditions, an insulating cover 17 is placed over each conductor 15, these covers having slots $17^a$ (see particularly Figs. 4, 5 and 6) through which the lugs of the battery plates may extend, and in proximity to the lugs when they extend through the cover into engagement with each conductor 15, an anode 18 of suitable material such as lead is maintained, which anode during the process of giving the plates their initial or forming charge, is by an electric current maintained positive to both the conductors 15 and the lugs $11^a$ of the positive plates.

As here shown, each anode 18 is in the form of a flat strip which extends substantially the full length of the cover 17 and is inserted in a longitudinal slot of the cover 17. These strips 18, one of which is associated with each conductor 15, are located above and centrally with respect to the conductors 15, and they are provided with openings 18ª through which the lugs 11ª of the positive plates 11 extend without engaging the strips 18. Likewise, each strip is provided at one end with an upstanding lug or boss 18ᵇ (see particularly Figs. 7 and 8) by which a suitable current supplying conductor may be connected thereto.

These anodes or strips 18 may be maintained positive to the conductors 15 and battery lugs 11ª in different ways. For example, a separate source of current other than the source utilized in charging the plates may be connected to these strips, but I prefer to utilize the charge forming current or circuit by connecting the strips to the positive plates of an adjacent cell in the circuit, as illustrated in Fig. 9. This will give a sufficient potential difference between the anode and the lugs of the positive plates and the conductors 15 to create a flow of current between the former and the latter through the electrolyte, and hence to cause the electrolytic action necessary to reduce or prevent the formation of salts where the lugs of the positive plates engage the conductors 15.

Referring to Fig. 9, it will be observed that I have here shown in plan, two rows of the charge forming tanks 10, and while I have not shown the storage battery plates I have shown in each tank by full lines, what I have heretofore termed the negative conductor 14 and the two positive conductors 15, and I have shown by dotted lines the anodes or strips 18 which are associated with and insulated from the positive conductors 15. In this figure the positive and negative current supplying conductors are shown at 19 and 20 respectively. As here shown, the conductor 19 is connected by branch conductors 21 to the conductors 15 in the first tank in the lower row, and this tank is connected by similar conductors 21 to the conductors 15 of the second tank, and similar connections are made throughout the tanks of both rows, the negative conductor 20 being connected to the last tank. The manner in which the conductor 21 may be extended down to the conductors 15 is illustrated in Fig. 2, which shows the conductors incased in protecting coverings indicated at 21ª.

To maintain the anodes 18 positive with respect to the conductors 15 and the lugs of the positive plates, the anodes in each tank are in this instance connected by conductors 22 to one of the conductors 21 associated with the tank in advance of it, except that the anodes in the first tank, i. e. the tank at the lower left hand corner of Fig. 9 will be connected to the conductor 19 far enough from this tank that a sufficient difference of potential is obtained between the anodes and the conductors 15 in this tank. By this means the anode strips are maintained at a sufficiently higher potential than the conductors 15 that there will be a flow of current between the anodes through the electrolyte to the conductors 15 associated therewith and the lugs of the positive plates which engage the conductors 15, to cause the electrolytic action already explained. In practice there will be a potential difference of approximately 2+ volts.

It was previously stated that it is not essential that the conductors 14 and 15 and the anode strips 18 be at the bottom of the tank. Obviously they can be placed near the top of the tank, or outside the tank if desired, in which event special hook-like extensions will be cast onto the plates in the manner indicated in Fig. 10, and these can be broken off after the plates receive their forming charge, leaving the usual lugs such as shown in Fig. 1.

Furthermore, it is not essential that an outside source of current such as illustrated in Fig. 9 be employed to maintain the anodes positive with respect to the conductors which the lugs of the positive plates engage, for a sufficient flow of current can be obtained for the purpose by employing in contact with the positive conductors which the lugs of the positive plates engage some metal such as cadmium or zinc amalgam which is electropositive to lead. This I have indicated diagrammatically in Fig. 10, wherein 10 represents the tank as heretofore described, 11 a positive plate, 11ᵇ a special hook-shaped lug cast onto the plate and extending over the top of the tank into a special trough 23 which extends lengthwise of the tank near the top thereof, the free end of the lug engaging an insulated conductor here designated 15ª, which conductor corresponds to either positive conductor 15 of the construction first described. In contact with this conductor 15ª and extending lengthwise thereof, is a strip 34 of cadmium or other metal which is electropositive to the conductor 15ª. In consequence when a suitable electrolyte such as a dilute solution of sulfuric acid is placed in the trough 23, the dissimilar metals 34 and 15ª cause a galvanic current to take place through the electrolyte, and this will maintain the strip 34ª positive with respect to the main conductor 15ª and the lugs of the positive plates which engage it, and this electrolytic action will prevent the formation of salts, or reduce them if formed, as already described.

Having described my invention, I claim:

1. The method of maintaining good electrical contact between conductors in an electrolyte which comprises maintaining the contacting surfaces of the conductors under cathode conditions.

2. The method of preventing relatively high resistance between two contacting conductors in an electrolyte which comprises preventing the formation of metallic salts at the contacting surfaces.

3. The method by which good conductivity is maintained at the contacting surfaces of a pair of engaging conductors in an electrolyte which comprises reducing or preventing the formation of metallic salts at and adjacent the contacting surfaces.

4. The method of making a contact of the desired conductivity between a pair of engaging conductors in an electrolyte which comprises causing an electrolytic action at and adjacent the contacting surfaces of the conductors so as to reduce or prevent the formation of a metallic salt at the contacting surfaces.

5. The method of producing good conductivity between a pair of engaging conductors in an electrolyte which comprises causing the flow of an electric current other than that which is normally designed to pass between the contacting surfaces of the conductors so as to produce an electrolytic action local to the contacting surfaces.

6. The method of making a contact in a receptacle containing an electrolyte for charging storage battery plates which comprises supporting the plates on a conductor through which the charging current passes with the contacting surfaces of the plates and the conductors maintained under cathode conditions.

7. The method of making contact between storage battery plates and a conductor so that the plates may be charged in a forming tank containing a suitable electrolyte which comprises causing engagement between the plates and the conductor and causing the passage of a current which produces an electrolytic action other than that produced in charging the plates and reduces or prevents the formation of metallic salts at the contacting surfaces.

8. The method of making electrical connection between storage battery plates and a conductor in an electrolyte for the passage of a charging current which comprises causing the passage of an electric current other than utilized in charging the plates to create an electrolytic action at and adjacent the contacting surfaces.

9. The method of making electrical connections between positive and negative storage battery plates and positive and negative conductors for the passage of an electric current for giving the plates a forming charge in a receptacle containing an electrolyte which comprises causing the plates to bear against the conductors and reducing or preventing the formation of metallic salts on the positive conductor and on the portions of the positive plates which engage it.

10. The method of making electrical connection between positive and negative conductors and positive and negative plates for the passage of current used in giving the plates their forming charge in a receptacle containing electrolyte which comprises causing the plates to bear against the conductors and causing the passage of a current at and adjacent the contacting surfaces of the positive conductor and the portions of the plates which engage it in such a manner as to produce an electrolytic action which reduces or prevents the formation of metallic salts at the contacting surfaces.

11. The method of securing conductivity between positive and negative storage battery plates and positive and negative conductors when the plates are in a receptacle containing an electrolyte for the purpose of receiving their forming charge which comprises allowing the plates to bear against the conductors and causing an electric current to pass between an anode conductor and the positive conductor or the portions of the positive plates which engage it, which anode conductor is electro positive to the positive conductor and the portions of the plates which engage it.

12. The method of maintaining a low resistance contact between a positive storage battery plate and a conductor in an electrolyte which comprises passing a current through a local circuit adjacent the contacting surfaces so as to reduce or prevent the formation of metallic salts thereon.

13. The method of maintaining good electrical connection between a positive storage battery plate and a conductor in a receptacle containing electrolyte which comprises causing an electrolytic action at the contacting portions of the plate and conductor by the passage of current to the conductor and portion of the plate engaging it from an adjacent conductor electro positive with respect thereto.

14. In combination with a receptacle containing electrolyte, a pair of conductors making contact in the electrolyte, and means for causing the passage of a current through the electrolyte adjacent the contacting surfaces to reduce or prevent the formation of metallic salts thereon.

15. In combination with a receptacle containing electrolyte and a pair of conductors engaging each other in the electrolyte, means for reducing or preventing the formation of metallic salts on the contacting surfaces comprising an anode adjacent the contacting surfaces maintained electro positive with respect to the conductors.

16. Means by which good electrical contact may be obtained between a pair of conductors in the electrolyte which comprises an anode in the electrolyte adjacent the contacting surfaces of the conductors, and means by which current is caused to flow through the electrolyte between said anode and one or both the conductors to cause a local electrolytic action.

17. The combination with a receptacle containing electrolyte, an anode and a cathode in the receptacle between which an electric current is adapted to be passed, a conductor which a portion of the anode engages, and means by which the engaging portions of the anode and conductor are maintained under cathode conditions.

18. In combination with a receptacle containing an electrolyte and an anode and a cathode between which an electric current is adapted to be passed, a conductor engaged by a portion of the anode adapted to supply current thereto, and a second conductor adjacent the contacting portions of the first-named conductor and the anode, and adapted to be maintained electro positive with respect thereto.

19. The combination with a receptacle adapted to contain electrolyte and also an anode and cathode, a conductor which a portion of the anode engages and adapted to supply current to the anode, and a second conductor insulated from the first-named conductor and from the portion of the anode which engages the conductor and arranged adjacent the contacting portions of the latter.

20. Apparatus for giving storage battery plates their initial or forming charge comprising a receptacle adapted to contain electrolyte and adapted to receive positive and negative storage battery plates, and means for forming electrical connection to the plates of one polarity comprising a conductor which supports said plates and which portions thereof engage.

21. Apparatus for giving positive and negative storage battery plates their initial or forming charge comprising a receptacle adapted to contain electrolyte and a plurality of positive and negative plates, and means for making electrical connections with the positive and negative plates comprising a pair of conductors insulated from each other and on which the plates are supported.

22. Apparatus for giving positive and negative storage battery plates their initial or forming charge comprising a receptacle adapted to contain an electrolyte and to receive a plurality of positive and negative plates and conductors in the bottom of the receptacle on which the positive and negative plates rest and adapted respectively to supply current to the positive plates and convey current from the negative plates.

23. Apparatus for giving storage battery plates their initial or forming charge comprising a receptacle adapted to contain electrolyte at a plurality of positive and negative plates, current conducting means for the negative plates, current conducting means for the positive plates which portions of the positive plates engage, and means for preventing the formation of metallic salts at the engaging portions of the positive plates and said last mentioned current conducting means.

24. Apparatus for giving storage battery plates their initial or forming charge comprising a receptacle adapted to contain electrolyte and a plurality of positive and negative plates, current conducting means for the negative plates, current conducting means for the positive plates engaged by portions of the positive plates, and an anode arranged adjacent the contacting portions of the positive plates and the current conducting means therefor.

25. Apparatus for giving storage battery plates their initial or forming charge comprising a receptacle adapted to contain electrolyte and a plurality of positive and negative plates, current conducting means for the negative plates, current conducting means for the positive plates engaged by portions of the positive plates, and an insulated anode adjacent the conducting means for the positive plates.

In testimony whereof, I hereunto affix my signature.

HARRY CROSS HUBBELL.